United States Patent
Butterworth et al.

(10) Patent No.: US 9,122,366 B2
(45) Date of Patent: Sep. 1, 2015

(54) RESIDUE INDICATORS

(71) Applicant: Navico Holding AS, Egersund (NO)

(72) Inventors: Paul Butterworth, Auckland (NZ); Andrew Corbett, Auckland (NZ)

(73) Assignee: Navico Holding AS, Egersund (NO)

( * ) Notice: Subject to any disclaimer, the term of this patent is extended or adjusted under 35 U.S.C. 154(b) by 179 days.

(21) Appl. No.: 13/886,839

(22) Filed: May 3, 2013

(65) Prior Publication Data

US 2014/0282190 A1 Sep. 18, 2014

Related U.S. Application Data

(60) Provisional application No. 61/800,880, filed on Mar. 15, 2013.

(51) Int. Cl.
*G06F 3/0481* (2013.01)

(52) U.S. Cl.
CPC .... *G06F 3/04812* (2013.01); *G06F 2203/0383* (2013.01)

(58) Field of Classification Search
CPC ................... G06F 2203/0383; G06F 3/04812; G06F 9/4445; H04L 43/0864
USPC .................................. 715/740, 859
See application file for complete search history.

(56) References Cited

U.S. PATENT DOCUMENTS

| | | |
|---|---|---|
| 4,829,493 A | 5/1989 | Bailey |
| 4,879,697 A | 11/1989 | Lowrance et al. |
| 5,025,423 A | 6/1991 | Earp |
| 5,191,341 A | 3/1993 | Gouard et al. |
| 5,537,380 A | 7/1996 | Sprankle, Jr. et al. |
| 6,225,984 B1 | 5/2001 | Crawford |
| 6,321,158 B1 | 11/2001 | DeLorme et al. |
| 6,392,675 B1* | 5/2002 | Becker et al. ................. 715/858 |
| 6,411,283 B1 | 6/2002 | Murphy |
| 6,418,080 B2 | 7/2002 | Inouchi |
| 6,421,299 B1 | 7/2002 | Betts et al. |
| 6,538,667 B1* | 3/2003 | Duursma et al. .............. 715/740 |
| 6,761,692 B2 | 7/2004 | Angelsen et al. |
| 6,816,782 B1 | 11/2004 | Walters et al. |
| 7,002,579 B2 | 2/2006 | Olson |
| 7,236,426 B2 | 6/2007 | Turner et al. |
| 7,430,461 B1 | 9/2008 | Michaels |

(Continued)

OTHER PUBLICATIONS

PCT International Search Report and Written Opinion; PCT/IB2013/060285; Feb. 18, 2014.

(Continued)

*Primary Examiner* — Nicholas Ulrich
(74) *Attorney, Agent, or Firm* — Pramudji Law Group PLLC; Ari Pramudji (57) ABSTRACT

A non-transitory computer-readable medium having stored thereon a plurality of computer-executable instructions which, when executed by a computer, cause the computer to: receive a user input at a remote computer communicably coupled to a host computer over a network; and display one or more residue indicators on a screen of the remote computer indicating receipt of the user input by the remote computer. The one or more residue indicators are displayed for a period of time approximately equal to a system latency time. The computer-executable instructions are further configured to cause the computer to receive output data from the host computer based on the user input; and display the output data on the screen of the remote computer.

20 Claims, 8 Drawing Sheets

(56) References Cited

U.S. PATENT DOCUMENTS

| | | | |
|---|---|---|---|
| 7,652,952 B2 | 1/2010 | Betts et al. | |
| 7,710,825 B2 | 5/2010 | Betts et al. | |
| 7,729,203 B2 | 6/2010 | Betts et al. | |
| 7,755,974 B2 | 7/2010 | Betts et al. | |
| 7,812,667 B2 | 10/2010 | Fagg | |
| 7,870,496 B1 | 1/2011 | Sherwani | |
| 7,890,867 B1 | 2/2011 | Margulis | |
| 8,019,532 B2 | 9/2011 | Sheha et al. | |
| 8,063,540 B2 | 11/2011 | Angelsen et al. | |
| 8,593,395 B1* | 11/2013 | Puckett et al. | 345/107 |
| 8,787,593 B1* | 7/2014 | Smith et al. | 381/104 |
| 2002/0035574 A1 | 3/2002 | Dumas | |
| 2002/0093541 A1 | 7/2002 | Schileru-Key | |
| 2003/0018714 A1* | 1/2003 | Mikhailov et al. | 709/203 |
| 2004/0193364 A1 | 9/2004 | Chojnacki | |
| 2005/0102101 A1 | 5/2005 | Beesley et al. | |
| 2006/0013066 A1 | 1/2006 | Nishimori et al. | |
| 2006/0119585 A1 | 6/2006 | Skinner | |
| 2006/0224940 A1 | 10/2006 | Lee | |
| 2008/0120553 A1* | 5/2008 | Bergman et al. | 715/740 |
| 2008/0126935 A1 | 5/2008 | Blomgren | |
| 2008/0204424 A1 | 8/2008 | Jin et al. | |
| 2009/0064055 A1 | 3/2009 | Chaudhri et al. | |
| 2009/0099871 A1 | 4/2009 | Gadodia | |
| 2009/0179789 A1 | 7/2009 | Haughay, Jr. et al. | |
| 2009/0249247 A1 | 10/2009 | Tseng et al. | |
| 2009/0284532 A1* | 11/2009 | Kerr et al. | 345/442 |
| 2009/0287409 A1 | 11/2009 | Summers | |
| 2010/0011299 A1* | 1/2010 | Brodersen et al. | 715/740 |
| 2010/0080082 A1 | 4/2010 | Betts et al. | |
| 2010/0145601 A1 | 6/2010 | Kurtti et al. | |
| 2010/0199225 A1 | 8/2010 | Coleman et al. | |
| 2010/0226203 A1 | 9/2010 | Buttle et al. | |
| 2010/0250122 A1 | 9/2010 | Kubota et al. | |
| 2011/0013484 A1 | 1/2011 | Coleman et al. | |
| 2011/0013485 A1 | 1/2011 | Maguire | |
| 2011/0019887 A1 | 1/2011 | Roehrig et al. | |
| 2011/0025720 A1 | 2/2011 | Jo et al. | |
| 2011/0154183 A1 | 6/2011 | Burns et al. | |
| 2012/0001773 A1 | 1/2012 | Lyons et al. | |
| 2012/0011437 A1 | 1/2012 | James et al. | |
| 2012/0011445 A1* | 1/2012 | Gilboa | 715/740 |
| 2012/0014220 A1 | 1/2012 | DePasqua | |
| 2012/0054671 A1* | 3/2012 | Thompson et al. | 715/784 |
| 2012/0069712 A1 | 3/2012 | Potanin et al. | |
| 2012/0106300 A1 | 5/2012 | Maguire | |
| 2012/0185801 A1 | 7/2012 | Madonna et al. | |
| 2012/0262379 A1* | 10/2012 | King | 345/173 |
| 2013/0007665 A1 | 1/2013 | Chaudhri et al. | |
| 2013/0031482 A1* | 1/2013 | Saul et al. | 715/740 |
| 2013/0290858 A1* | 10/2013 | Beveridge | 715/740 |
| 2014/0002361 A1* | 1/2014 | Ballard et al. | 345/163 |
| 2014/0013279 A1* | 1/2014 | Mongia et al. | 715/835 |

OTHER PUBLICATIONS

PCT International Search Report and Written Opinion; PCT/US2013/047869; Oct. 21, 2013.
PCT International Search Report and Written Opinion; PCT/US2013/048177; Oct. 21, 2013.
PCT International Search Report and Written Opinion; PCT/US2013/048129; Oct. 17, 2013.
PCT International Search Report and Written Opinion; PCT/US2013/047926; Oct. 11, 2013.
PCT International Search Report and Written Opinion; PCT/US2013/047645; Sep. 27, 2013.

\* cited by examiner

RESIDUE INDICATORS

CROSS-REFERENCE TO RELATED APPLICATIONS

This application claims benefit of U.S. provisional patent application Ser. No. 61/800,880, filed Mar. 15, 2013 and titled RESIDUE INDICATORS, which is herein incorporated by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Various forms of data, such as marine electronics data, may be processed and/or displayed using a host computer. Marine electronics data may include, for example, sonar data, chart data, radar data, or navigation data. In one scenario, a user may be allowed to interact with the host computer using a remote computer, where the remote computer may be connected to the host computer over a network.

SUMMARY

Described herein are various implementations of a non-transitory computer-readable medium having stored thereon a plurality of computer-executable instructions which, when executed by a computer, cause the computer to: receive a user input at a remote computer communicably coupled to a host computer over a network; and display one or more residue indicators on a screen of the remote computer indicating receipt of the user input by the remote computer. The one or more residue indicators are displayed for a period of time approximately equal to a system latency time. The computer-executable instructions are further configured to cause the computer to receive output data from the host computer based on the user input; and display the output data on the screen of the remote computer.

Described herein are various implementations of a method, which includes receiving a user input at a remote computer communicably coupled to a host computer over a network; and displaying one or more residue indicators on a screen of the remote computer indicating receipt of the user input by the remote computer. The one or more residue indicators are displayed for a period of time approximately equal to a system latency time. The method further includes receiving output data from the host computer based on the user input; and displaying the output data on the screen of the remote computer.

Described herein are various implementations of a computer system having a processor; and a memory comprising program instructions executable by the processor to: receive a user input at a remote computer communicably coupled to a host computer over a network; and display one or more residue indicators on a screen of the remote computer indicating receipt of the user input by the remote computer. The one or more residue indicators are displayed for a period of time approximately equal to a system latency time. The program instructions are further configured to receive output data from the host computer based on the user input; and display the output data on the screen of the remote computer.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

Various implementations of remotely accessing a host computer described above will now be described in more detail with reference to FIGS. 1-8.

Host Computer and Remote Computer

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

Figure 1:
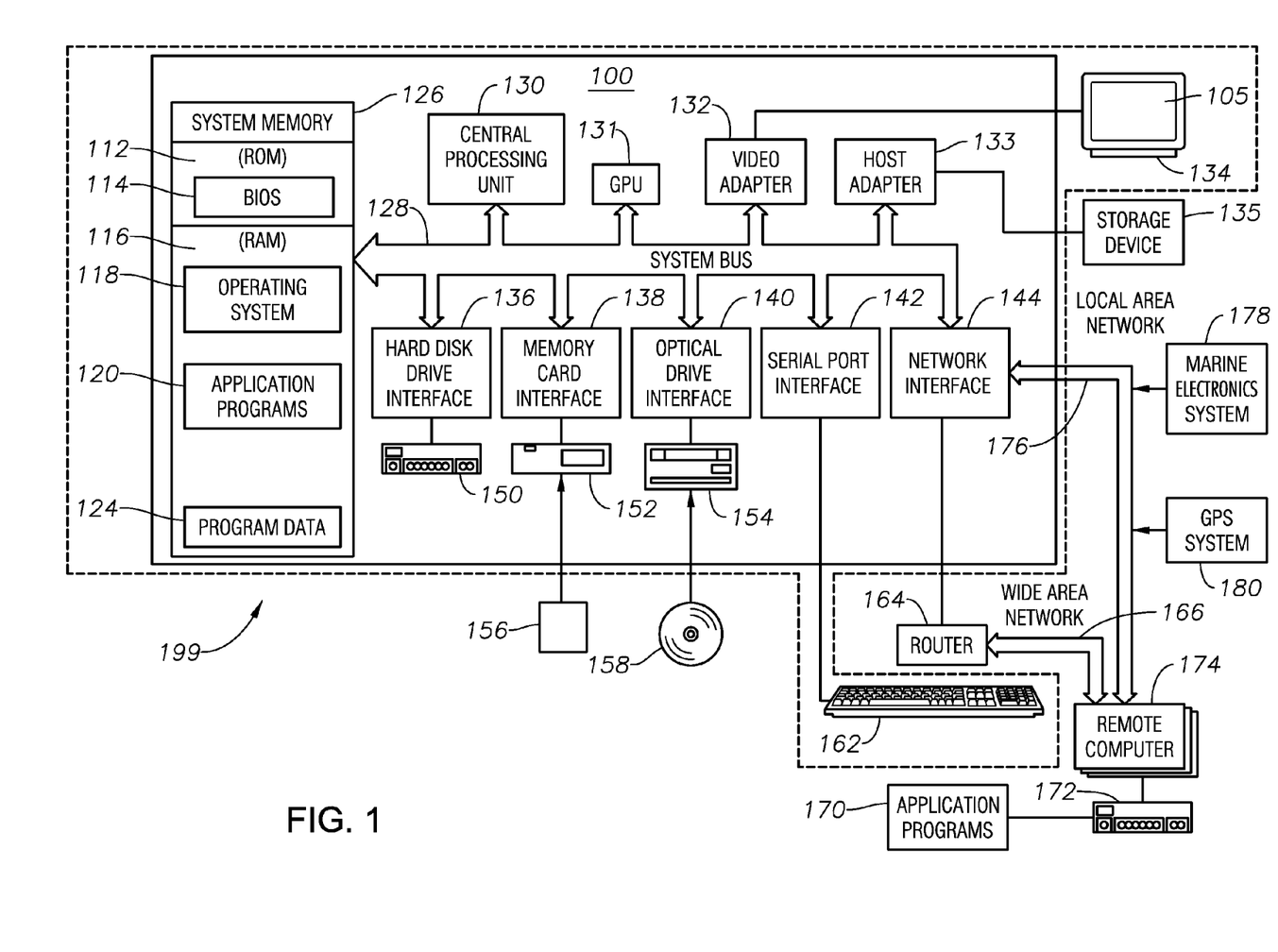
FIG. 1 illustrates a schematic diagram of a host computer having a computing system in accordance with implementations of various techniques described herein.

FIG. 1 illustrates a schematic diagram of a host computer 199 having a computing system 100 in accordance with implementations of various techniques described herein. The host computer 199 may be any type of electrical and/or electronics device capable of processing data via the host computing system 100. In one implementation, the host computer 199 may be a marine instrument, such that the host computer 199 may use the computing system 100 to display and/or process one or more types of marine electronics data, such as chart data, sonar data, structure data, radar data, navigation data, or any other type known to those skilled in the art. In a further implementation, the host computer 199 may be a multi-function display (MFD), such that the host computer 199 may be capable of displaying and/or processing multiple types of marine electronics data.

The computing system 100 may be a conventional desktop, a handheld device, personal digital assistant, a server computer, electronic device/instrument, laptop, tablet, or part of a navigation system, marine electronics, or sonar system. It should be noted, however, that other computer system configurations may be used. The computing system 100 may include a central processing unit (CPU) 130, a system memory 126, a graphics processing unit (GPU) 131 and a system bus 128 that couples various system components including the system memory 126 to the CPU 130. Although only one CPU 130 is illustrated in FIG. 1, it should be understood that in some implementations the computing system 100 may include more than one CPU 130.

The CPU 130 can include a microprocessor, a microcontroller, a processor, a programmable integrated circuit, or a combination thereof. The CPU 130 can comprise an off-the-shelf processor such as a Reduced Instruction Set Computer (RISC), or a Microprocessor without Interlocked Pipeline Stages (MIPS) processor, or a combination thereof. The CPU 130 may also include a proprietary processor.

The GPU 131 may be a microprocessor specifically designed to manipulate and implement computer graphics. The CPU 130 may offload work to the GPU 131. The GPU 131 may have its own graphics memory, and/or may have access to a portion of the system memory 126. As with the CPU 130, the GPU 131 may include one or more processing units, and each processing unit may include one or more cores.

The CPU 130 may provide output data to a GPU 131. The GPU 131 may generate graphical user interfaces that present the output data. The GPU 131 may also provide objects, such as menus, in the graphical user interface. A user may provide inputs by interacting with the objects. The GPU 131 may receive the inputs from interaction with the objects and provide the inputs to the CPU 130. A video adapter 132 may be provided to convert graphical data into signals for a monitor 134. The monitor 134 includes a screen 105. The screen 105 can be sensitive to heat or touching (now collectively referred to as a "touch screen"). In one implementation, the host computer 199 may not include a monitor 134.

The system bus 128 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 126 may include a read only memory (ROM) 112 and a random access memory (RAM) 116. A basic input/output system (BIOS) 114, containing the basic routines that help transfer information between elements within the computing system 100, such as during start-up, may be stored in the ROM 112.

The computing system 100 may further include a hard disk drive interface 136 for reading from and writing to a hard disk 150, a memory card reader 152 for reading from and writing to a removable memory card 156, and an optical disk drive 154 for reading from and writing to a removable optical disk 158, such as a CD ROM or other optical media. The hard disk 150, the memory card reader 152, and the optical disk drive 154 may be connected to the system bus 128 by a hard disk drive interface 136, a memory card reader interface 138, and an optical drive interface 140, respectively. The drives and their associated computer-readable media may provide non-volatile storage of computer-readable instructions, data structures, program modules and other data for the computing system 100.

Although the computing system 100 is described herein as having a hard disk, a removable memory card 156 and a removable optical disk 158, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 100 may also include a host adapter 133 that connects to a storage device 135 via a small computer system interface (SCSI) bus, a Fiber Channel bus, an eSATA bus, or using any other applicable computer bus interface. The computing system 100 can also be connected to a router 164 to establish a wide area network (WAN) 166 with one or more remote computers 174. The router 164 may be connected to the system bus 128 via a network interface 144. The remote computers 174 can also include hard disks 172 that store application programs 170.

Figure 2:
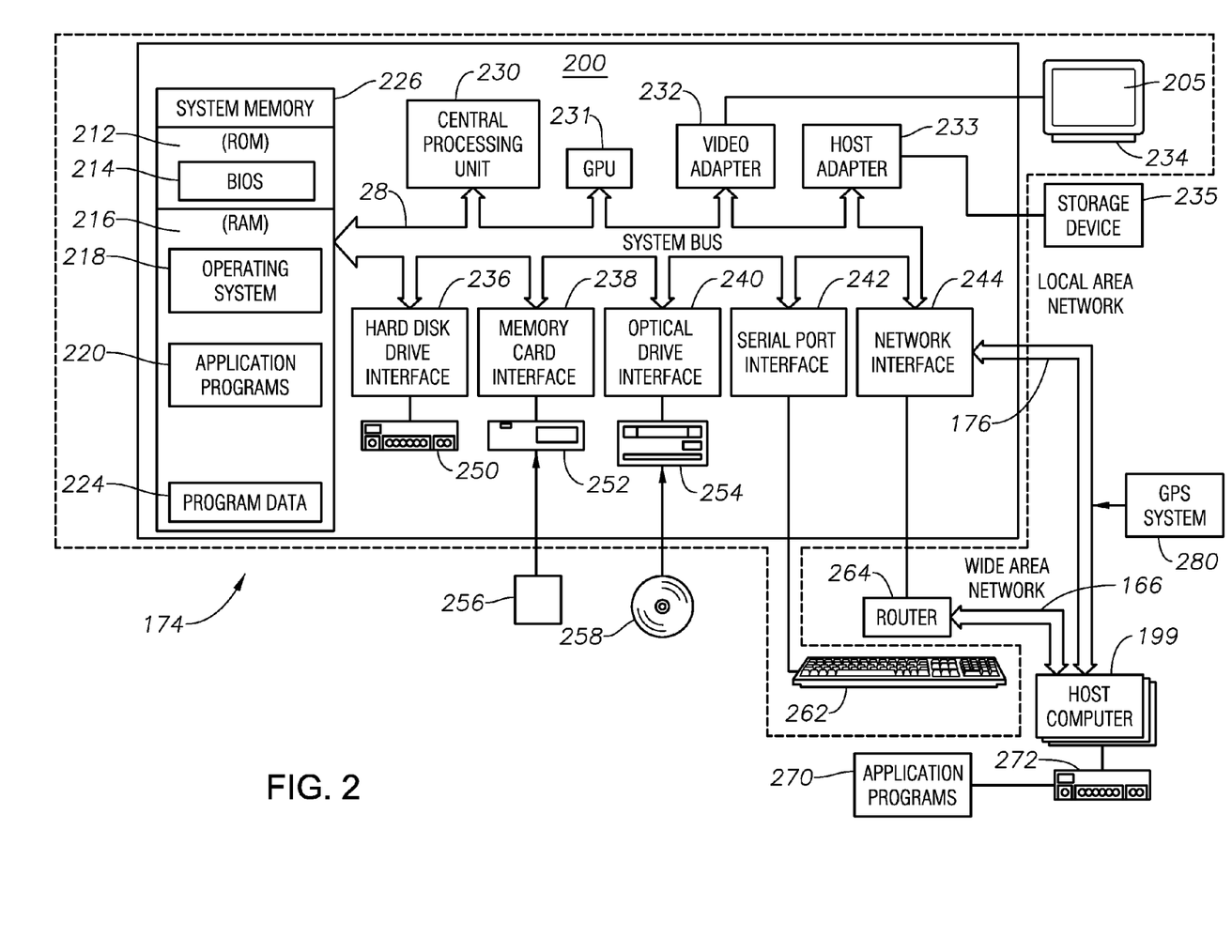
FIG. 2 illustrates a schematic diagram of the remote computer having a computing system in accordance with implementations of various techniques described herein.

In another implementation, as discussed in more detail with respect to FIG. 2, the computing system 100 may also connect to one or more remote computers 174 via local area network (LAN) 176 or the WAN 166. When using a LAN networking environment, the computing system 100 may be connected to the LAN 176 through the network interface or adapter 144. The LAN 176 may be implemented via a wired connection or a wireless connection. The LAN 176 may be implemented using Wi-Fi technology, cellular technology, or any other implementation known to those skilled in the art. The network interface 144 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 174. It will be appreciated that the network connections shown are exemplary and other means of establishing a communications link between the computer systems may be used.

A number of program modules may be stored on the hard disk 150, memory card 156, optical disk 158, ROM 112 or RAM 116, including an operating system 118, one or more application programs 120, and program data 124. In certain implementations, the hard disk 150 may store a database system. The database system could include, for example, recorded points. The application programs 120 may include various mobile applications ("apps") and other applications configured to perform various methods and techniques described herein. The operating system 118 may be any suitable operating system that may control the operation of a networked personal or server computer.

A user may enter commands and information into the computing system 100 through input devices such as buttons 162. Other input devices may include a microphone (not shown). These and other input devices may be connected to the CPU 130 through a serial port interface 142 coupled to system bus 128, but may be connected by other interfaces, such as a parallel port, game port or a universal serial bus (USB).

Certain implementations may be configured to be connected to a GPS system 180, and/or a marine electronics system 178. The GPS system 180, and/or marine electronics system 178 may be connected via the network interface 144. The marine electronics system 178 may include one or more marine electronics data modules configured to transmit marine electronics data to the host computer 199 for processing and/or display. The marine electronics data transmitted to the host computer 199 may include chart data, sonar data, structure data, radar data, navigation data, or any other type known to those skilled in the art. The computing system 100, the monitor 134, the screen 105, and the buttons 162 may be integrated into a console of the host computer 199.

FIG. 2 illustrates a schematic diagram of the remote computer 174 having a computing system 200 in accordance with implementations of various techniques described herein. The remote computer 174 may be a handheld device, personal digital assistant, electronic device/instrument, laptop, or tablet. It should be noted, however, that other remote computer configurations may be used.

Generally, the remote computer 174 includes at least some components which have generally similar functionality as those described with respect to the host computer 199. In particular, the remote computer 174 may include a remote screen 205, where, in some implementations, the remote screen 205 may be a touch screen. In addition, for some implementations, a user may enter commands and information into the computing system 200 through input devices such as a mouse. These and other input devices may be connected to the CPU 230 through a serial port interface 242 coupled to system bus 228, but may be connected by other interfaces, such as a parallel port, game port or a universal serial bus (USB).

As noted earlier, the computing system 200 may connect to the host computer 199 via the LAN 176 or the WAN 166. When using an LAN networking environment, the computing system 200 may be connected to the LAN 176 through a network interface or adapter 244. The LAN 176 may be implemented via a wired connection or a wireless connection. The LAN 176 may be implemented using Wi-Fi technology, cellular technology, or any other implementation known to those skilled in the art. The network interface 244 may also utilize remote access technologies (e.g., Remote Access Service (RAS), Virtual Private Networking (VPN), Secure Socket Layer (SSL), Layer 2 Tunneling (L2T), or any other suitable protocol). It will be appreciated that the network connections shown are exemplary and other means of establishing a communications link between the computer systems may be used.

Remote Operation

The remote computer 174 may be configured to allow a user to interact with, or control, the marine electronics data stored on the host computer 199 and the menus, submenus, and/or menu options available on a graphical user interface of the host computer 199. In one implementation, the remote computer 174 may operate as a screen mirror for the host computer 199, such that the remote screen 205 of the remote computer 174 may display substantially the same content displayed on the screen 105 of the host computer 199. In another implementation, where the host computer 199 does not include the monitor 134, the remote screen 205 may display the marine electronics data and/or the graphical user interfaces of the host computer 199 in much the same way as would screen 105.

A user input may be provided to the host computer 199 via the remote computer 174 in order to interact with and/or control the marine electronics data and/or the graphical user interfaces being displayed on the screen 205. For example, the user input may be used to select a menu option being displayed on the screen 205. The user input may be provided via touching the remote screen 205 and/or through an input device coupled to the remote computer 174, such as the mouse.

Data associated with the user input may then be transmitted to the host computer 199 over the LAN 176 or the WAN 166. In one implementation, the data associated with the user input may include remote screen coordinates corresponding to an area of the remote screen 205 selected by the user via touching and/or the input device. The host computer 199 may interpret the data associated with the user input, and, in response, transmit output data to the remote computer 174 over the LAN 176 which corresponds to the user input. The remote computer 174 may display the output data using the remote screen 205.

For example, the remote computer 174 may operate as a screen mirror, such that the remote screen 205 may display chart data (e.g., a map) also being displayed on the screen 105. In order to view portions of the map not being displayed on the remote screen 205, the user may perform a swipe gesture, such as by touching and dragging a finger downwardly for a chosen distance across the map shown on the remote screen 205. Data associated with the swipe gesture may then be transmitted to the host computer 199, including the remote screen coordinates corresponding to the area of the remote screen 205 touched by the swipe gesture. The host computer 199 may interpret the data associated with the swipe gesture and transmit output data to the remote computer 174 for display. The displayed output data may represent the previously-displayed map having been moved downwardly (i.e., dragged) across the remote screen 205 by generally the same distance as the chosen distance, thereby revealing portions of the map not previously displayed. In such an example, the map being shown on the screen 105 may also have been moved downwardly (i.e., dragged) by generally the same distance as the chosen distance.

Residue Indicator

In some cases, a lag, or system latency time, may exist between when the user input is provided to the remote computer 174 to when the output data is displayed on the remote screen 205. The system latency time may be caused by delays from transmitting the data associated with the user input to the host computer 199, delays from interpreting the data associated with the user input, and/or delays from transmitting output data to the remote computer 174. Further, the size of the system latency time may depend on factors such as the type of network connection, delays due to compression and decompression of graphical images, and/or the amount of data being transmitted.

In one implementation, to provide feedback to the user during the system latency time, one or more residue indicators may be displayed on the remote screen 205, where the residue indicators indicate receipt of the user input by the remote computer 174. The residue indicators may be displayed for a period of time approximately equal to the system latency time. In one implementation, the residue indicators may be displayed in an area of the remote screen 205 corresponding to the user input, such as the area of the remote screen 205 which was selected by the user via touching and/or the input device. The residue indicators may be produced by the remote computer 174. In some implementations, the residue indicators may be displayed only on the remote screen 205 and not on screen 105. In such an implementation, the residue indicators may be displayed to the remote screen 205 without noticeable lag to the user.

The number and/or positioning of the one or more residue indicators may be determined by the remote computer 174 based on the size of the area of the remote screen 205 selected by the user via touching and/or the input device. The number of the residue indicators being displayed may increase as the area of the remote screen 205 selected by the user increases. The residue indicators may also be positioned generally along the same area of the remote screen 205 selected by the user via touching and/or the input device. For example, the user may perform a swipe gesture along a linear area of the remote screen 205, and, in response, the remote computer 174 may position one or more residue indicators along the same linear area.

In addition, the user may perform a swipe gesture or any other user input, such as clicking and dragging a mouse, in any direction across the remote screen (e.g., right, left, top, or bottom) in order to display the one or more residue indicators on the remote screen 205. The user may also perform a single selection, such as through a single touch to the remote screen 205 or a single click of a mouse, in order to display the one or more residue indicators on the remote screen 205.

The residue indicators may also be displayed in various configurations. In one implementation, the residue indicators may include one or more circular symbols. In another implementation, the residue indicator may be represented as a single, continuous line. In yet another implementation, the residue indicators may be represented in more than one color. For example, the residue indicators may change color depending upon a speed of a swipe gesture. Further, the residue indicators may diminish in thickness and/or opacity, such that the residue indicators may fade from the remote screen 205 during the period of time approximately equal to the system latency time.

In one implementation, the system latency time may be a fixed time which may be representative of an average latency time between the remote computer 174 and the host computer 199. In another implementation, the system latency time may be determined by the host computer 199 measuring the round-trip delay for messages sent across the LAN 176 and estimating the system latency time based on the round-trip delay. For example, the host computer 199 may append a timestamp to each video data frame sent to the remote computer 174. The timestamp may represent a time at which the video data frame was displayed on the screen 105. The remote computer 174 may then send an event message to the host computer 199, which may also include a timestamp of the last video data frame received. The host computer 199 may then receive the event message, and calculate the round-trip delay by subtracting the timestamp received from the remote computer 174 from a current time. The host computer 199 may use this calculated round-trip delay to estimate the system latency time.

Figure 3:
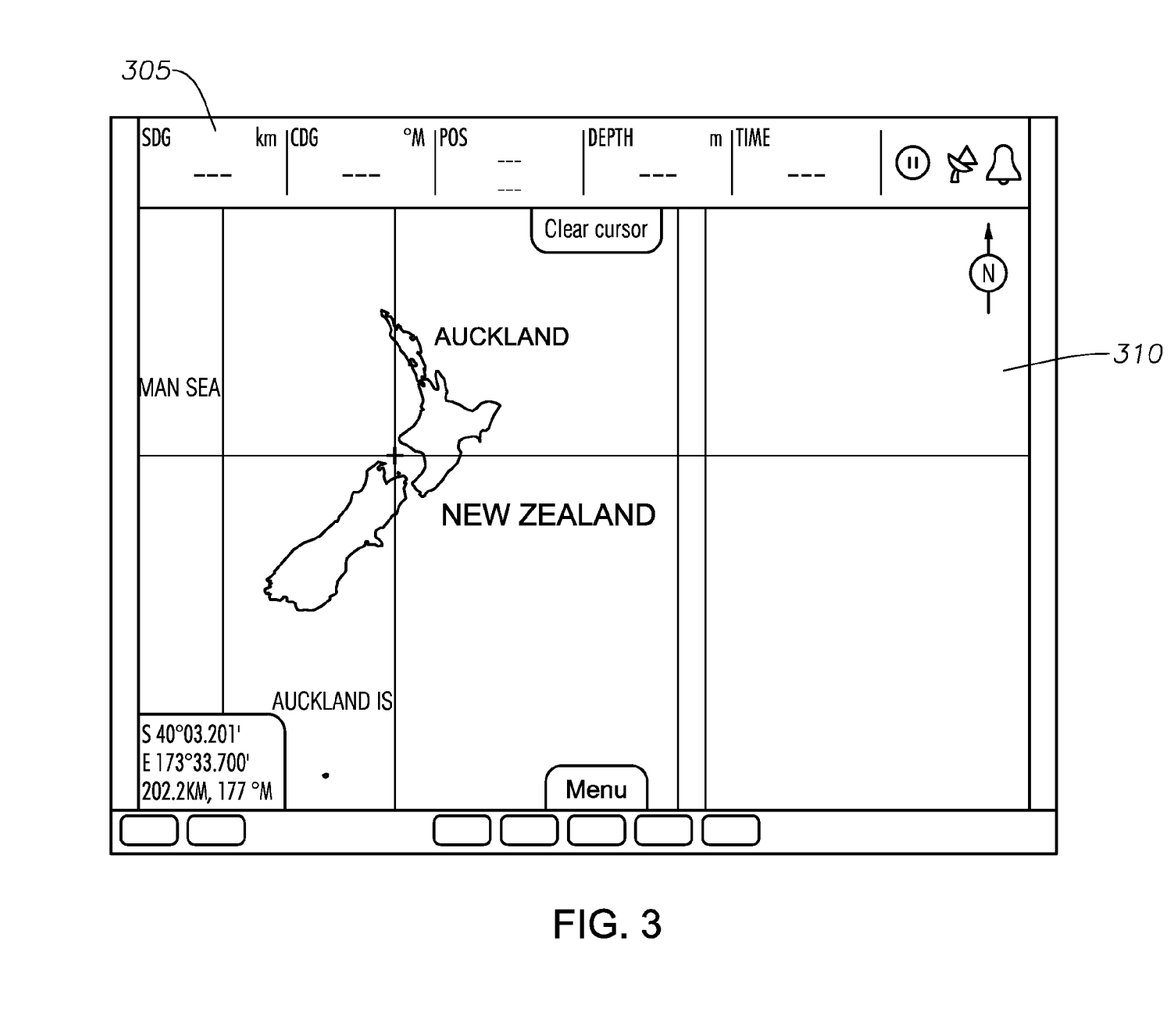
FIGS. 3-7 illustrate various schematic diagrams of a remote computer having a remote screen in accordance with implementations of various techniques described herein.

In one implementation, FIG. 3 illustrates a schematic diagram of a remote computer having a remote screen 305 in accordance with implementations of various techniques described herein. The remote computer may be implemented as a tablet, and the remote screen 305 which may be operable as a touch screen. The remote screen 305 may display chart data in the form of a map 310.

Figure 4:
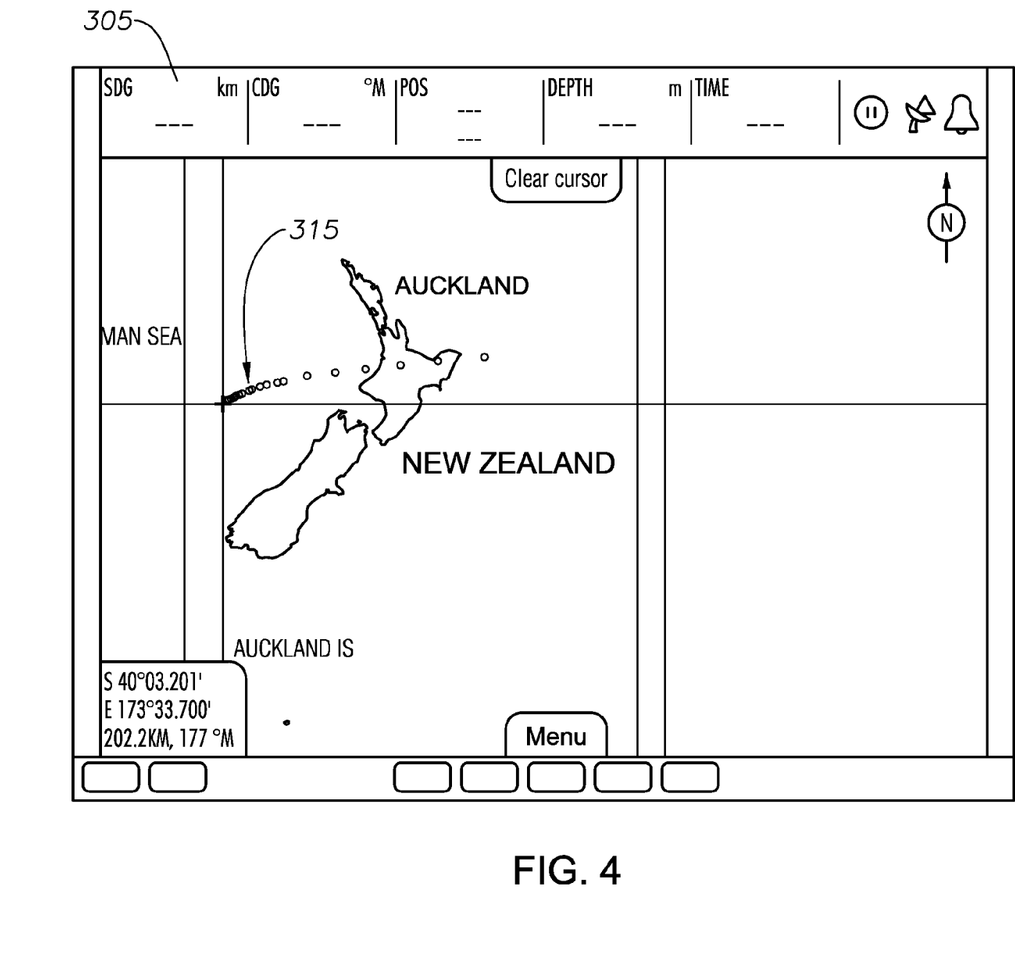

FIG. 4 illustrates a user having performed a swipe gesture, such as by touching and dragging a finger rightward for a chosen distance across the map on the remote screen 305. Due to system latency time, the map 310 has not yet moved rightward (i.e., dragged) across the remote screen 305. However, one or more residue indicators 315 may be displayed in response to the user input. In particular, the residue indicators 315 include multiple circular symbols arranged along generally the same area of the remote screen 305 across which the user performed the swipe gesture.

Figure 5:
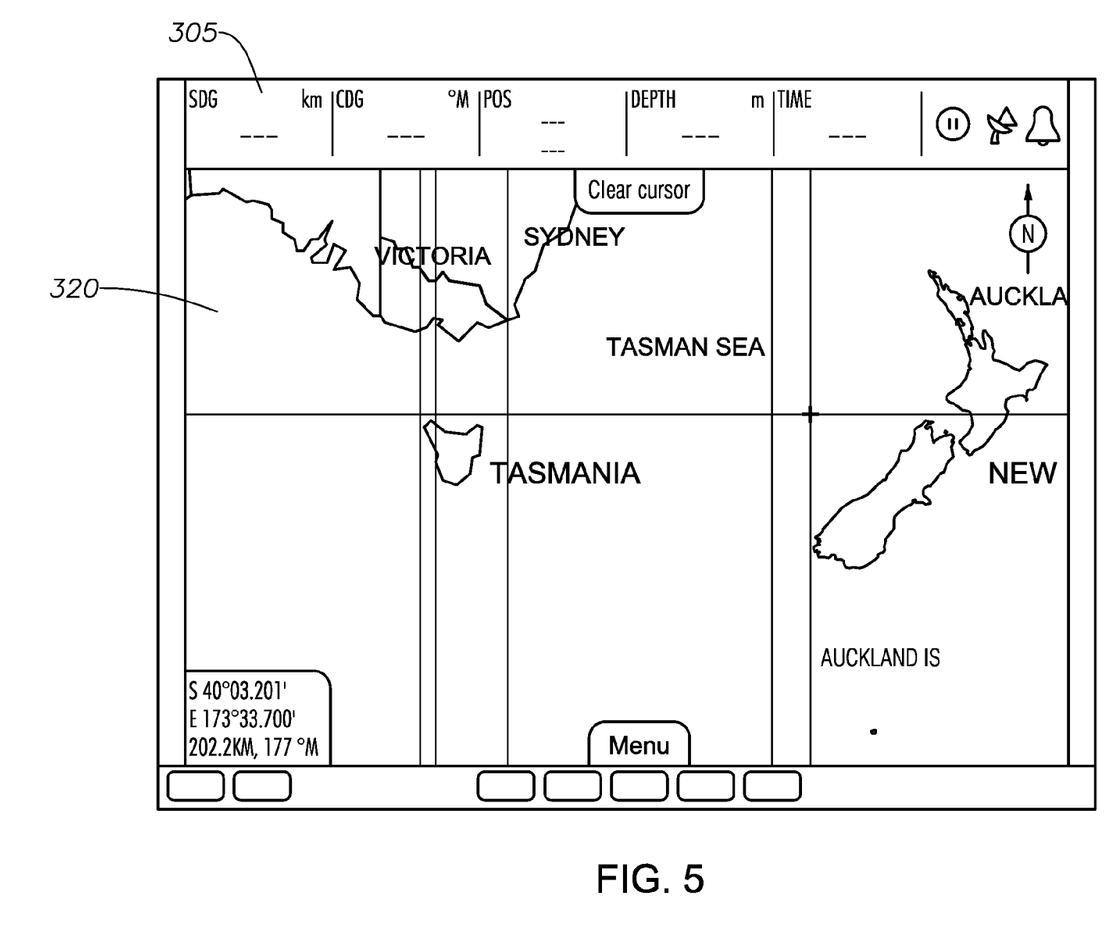

As shown in FIG. 5, after a period of time approximately equal to the system latency time, the remote screen 305 may display the map 320, where map 320 represents the previously-displayed map 310 having been moved rightward (i.e., dragged) across the remote screen 305 by generally the same distance as the chosen distance. In addition, the one or more residue indicators 315 may no longer be displayed on the remote screen 305.

Figure 6:
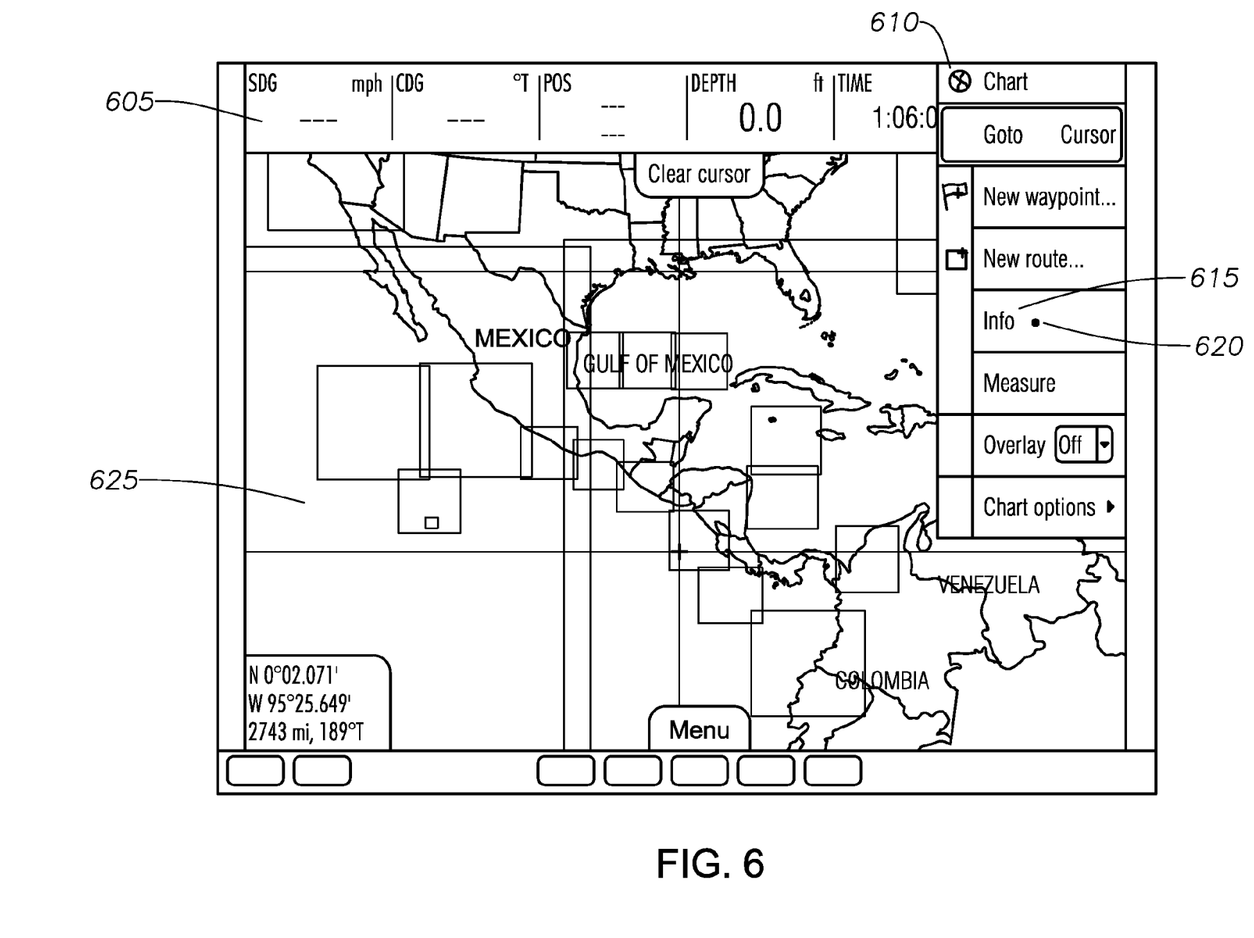

In another implementation, as shown in FIG. 6, remote screen 605 may display chart data in the form of a map 625 and a menu 610 having a menu option 615. A user may have performed a tapping gesture to the remote screen 605 and/or performed a single click of a mouse in order to select menu option 615. Due to system latency time, however, menu option 615 may not be displayed on the remote screen 605 as having been selected. A residue indicator 620 may be displayed to indicate to the user that the selection of the menu option 615 has been received. The residue indicator 620 may be represented by a single, circular symbol.

Figure 7:
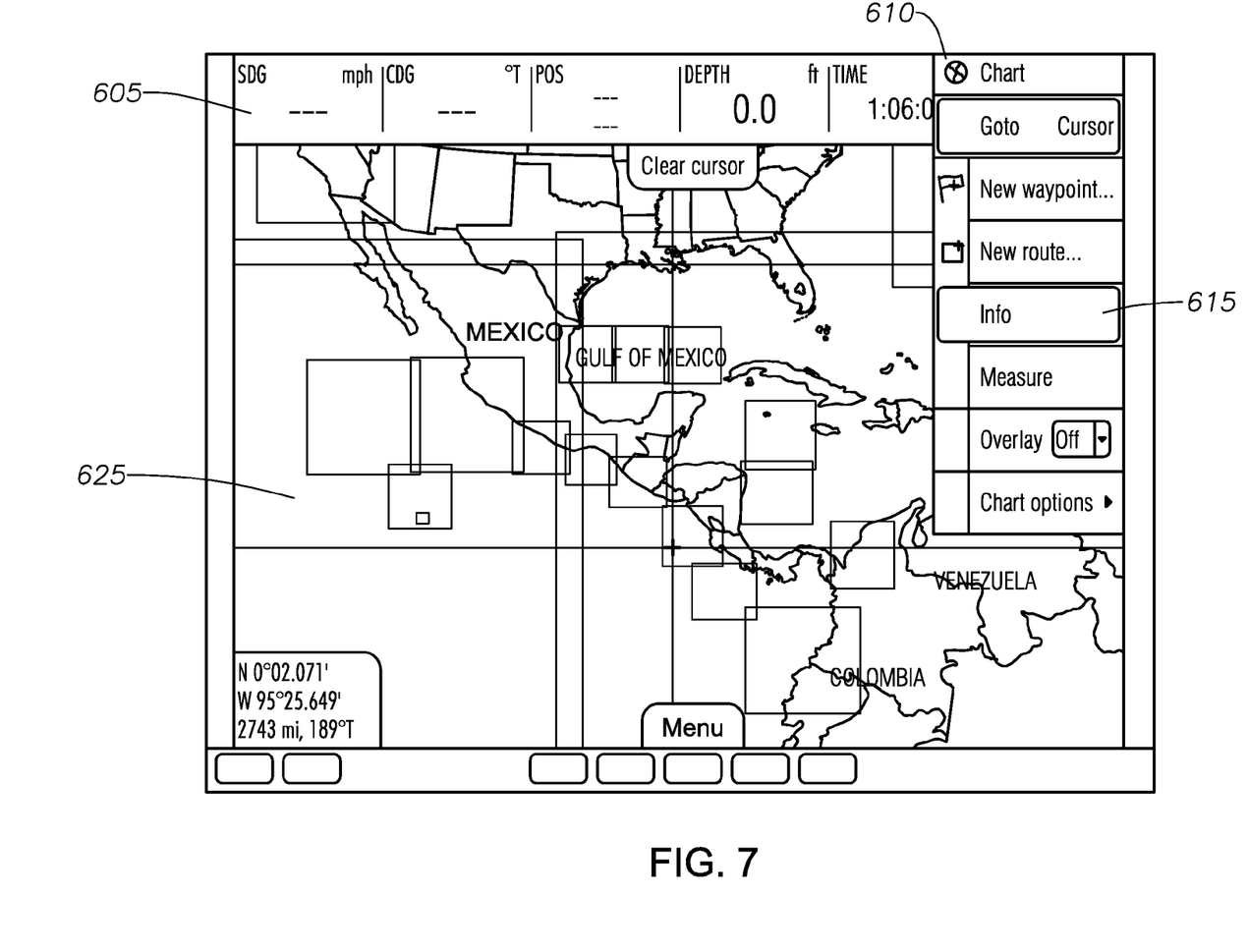

As shown in FIG. 7, after a period of time approximately equal to the system latency time, the remote screen 605 may display that the menu option 615 has been selected via a highlighting of the menu option 615. In addition, the residue indicators 620 may no longer be displayed on the remote screen 605.

Figure 8:
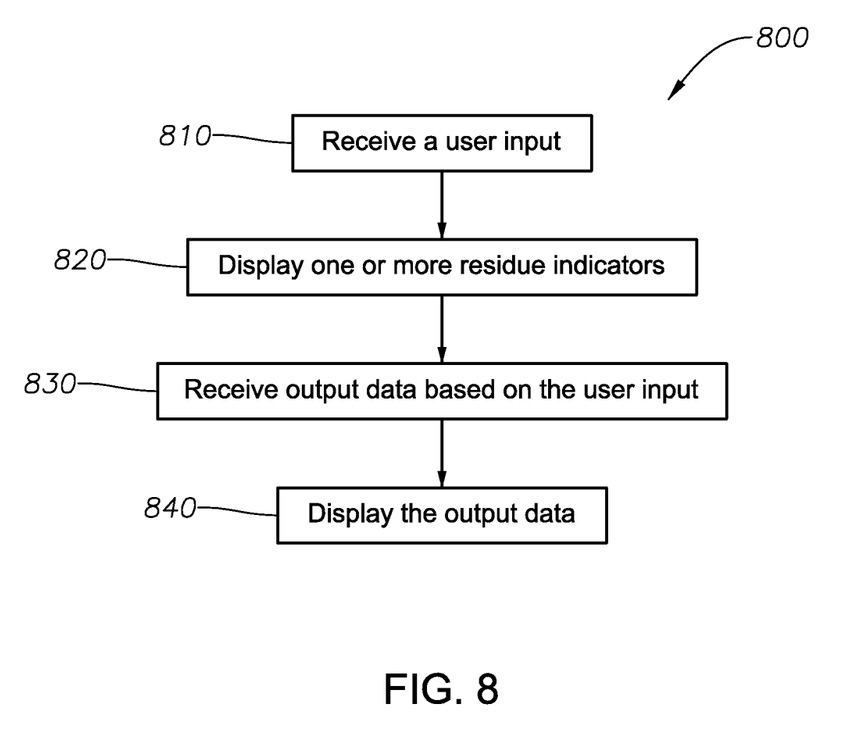
FIG. 8 illustrates a flow diagram of a method in accordance with implementations of various techniques described herein.

FIG. 8 illustrates a flow diagram of a method 800 in accordance with implementations of various techniques described herein. In one implementation, method 800 may be performed by a computer application, such a remote computer. As discussed previously, the remote computer may be communicably coupled to a host computer over a network, such as an LAN. It should be understood that while method 800 indicates a particular order of execution of operations, in some implementations, certain portions of the operations might be executed in a different order. Further, in some implementations, additional operations or steps may be added to the method 800. Likewise, some operations or steps may be omitted.

At step 810, the remote computer may receive a user input. The user input may be provided via touching a remote screen of the remote computer (e.g., a swipe gesture) and/or through an input device coupled to the remote computer, such as a mouse.

At step 820, the remote computer may display one or more residue indicators. The residue indicators may indicate receipt of the user input by the remote computer, and may be displayed for a period of time approximately equal to a system latency time.

At step 830, the remote computer may receive output data based on the user input. In particular, the remote computer may transmit data associated with the user input to the host computer, and the host computer may interpret the data associated with the user input. In response, the host computer may transmit output data to the remote computer which corresponds to the user input.

At step 840, the remote computer may display the output data. In particular, the remote computer may display the output data on the remote screen.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium having stored thereon a plurality of computer-executable instructions which, when executed by a computer, cause the computer to:

receive a user input at a remote computer communicably coupled to a host computer over a network;

display one or more residue indicators on a screen of the remote computer indicating receipt of the user input by the remote computer, wherein the one or more residue indicators are displayed for a period of time approximately equal to a system latency time and wherein the one or more residue indicators fade from the screen during the period of time;

receive output data from the host computer based on the user input; and display the output data on the screen of the remote computer.

2. The non-transitory computer-readable medium of claim 1, wherein the one or more residue indicators are displayed on an area of the screen generally corresponding to the user input.

3. The non-transitory computer-readable medium of claim 1, wherein a number of the one or more residue indicators displayed is based on a size of an area of the screen generally corresponding to the user input.

4. The non-transitory computer-readable medium of claim 1, wherein the period of time approximately equal to the system latency time is a fixed amount.

5. The non-transitory computer-readable medium of claim 1, wherein the period of time approximately equal to the system latency time is determined by the host computer.

6. The non-transitory computer-readable medium of claim 1, wherein the plurality of computer-executable instructions are further configured to:
  send to the host computer data associated with the user input; and
  receive the output data from the host computer based on the data associated with the user input.

7. The non-transitory computer-readable medium of claim 1, wherein the remote computer comprises a tablet computer.

8. The non-transitory computer-readable medium of claim 1, wherein the user input is provided through a touching of the screen or an input from a mouse.

9. The non-transitory computer-readable medium of claim 1, wherein the host computer is a multi-function display.

10. The non-transitory computer-readable medium of claim 1, wherein the host computer determines the period of time based on a measured round-trip delay between the remote computer and the host computer.

11. A method, comprising:
  receiving a user input at a remote computer communicably coupled to a host computer over a network;
  displaying one or more residue indicators on a screen of the remote computer indicating receipt of the user input by the remote computer, wherein the one or more residue indicators are displayed for a period of time approximately equal to a system latency time and wherein the period of time is determined by the host computer;
  receiving output data from the host computer based on the user input; and
  displaying the output data on the screen of the remote computer.

12. The method of claim 11, wherein the one or more residue indicators are displayed on an area of the screen generally corresponding to the user input.

13. The method of claim 11, wherein the one or more residue indicators fade from the screen during the period of time approximately equal to the system latency time.

14. The method of claim 11, wherein the period of time approximately equal to the system latency time is a fixed amount.

15. The method of claim 11, wherein the host computer determines the period of time based on a measured round-trip delay between the remote computer and the host computer.

16. A computer system, comprising:
  a processor; and
  a memory comprising program instructions executable by the processor to:
    receive a user input at a remote computer communicably coupled to a host computer over a network;
    display one or more residue indicators on a screen of the remote computer indicating receipt of the user input by the remote computer, wherein the one or more residue indicators are displayed for a period of time approximately equal to a system latency time and wherein the period of time is a fixed amount;
    receive output data from the host computer based on the user input; and
    display the output data on the screen of the remote computer.

17. The system of claim 16, wherein the one or more residue indicators are displayed on an area of the screen generally corresponding to the user input.

18. The system of claim 16, wherein a number of the one or more residue indicators displayed is based on a size of an area of the screen generally corresponding to the user input.

19. The system of claim 16, wherein the one or more residue indicators fade from the screen during the period of time approximately equal to the system latency time.

20. The system of claim 16, wherein the user input is provided through a touching of the screen or an input from a mouse.

* * * * *